(12) United States Patent
Seale et al.

(10) Patent No.: US 8,339,704 B2
(45) Date of Patent: *Dec. 25, 2012

(54) PHOTOLITHOGRAPHED MICRO-MIRROR WELL FOR 3D TOMOGRAM IMAGING OF INDIVIDUAL CELLS

(75) Inventors: Kevin T. Seale, Nashville, TN (US);
Ronald S. Reiserer, Nashville, TN (US);
John P. Wikswo, Brentwood, TN (US);
Sandra Rosenthal, Nashville, TN (US);
Jeffrey Chamberlain, Seattle, WA (US);
Charles Wright, Chicago, IL (US);
Dmitry Markov, Nashville, TN (US);
Chris Janetopoulos, Nashville, TN (US)

(73) Assignee: Vanderbilt University, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/112,901

(22) Filed: May 20, 2011

(65) Prior Publication Data
US 2011/0221749 A1 Sep. 15, 2011

Related U.S. Application Data

(62) Division of application No. 11/943,222, filed on Nov. 20, 2007, now Pat. No. 7,974,003.

(60) Provisional application No. 60/860,755, filed on Nov. 22, 2006.

(51) Int. Cl.
*G02B 21/34* (2006.01)
*G01N 21/01* (2006.01)

(52) U.S. Cl. .......................... 359/398; 359/368; 359/634
(58) Field of Classification Search .................. 359/368, 359/391–397, 838–861, 634, 577–590, 639
See application file for complete search history.

(56) References Cited

U.S. PATENT DOCUMENTS

| | | | |
|---|---|---|---|
| 5,844,364 A | 12/1998 | Beardmore | |
| 6,027,695 A | 2/2000 | Oldenburg et al. | |
| 6,803,205 B2 | 10/2004 | Duffy et al. | |
| 7,202,945 B2 | 4/2007 | Erlbacher et al. | |
| 7,974,003 B2 * | 7/2011 | Seale et al. | 359/398 |
| 2001/0033414 A1 * | 10/2001 | Yahiro | 359/383 |
| 2004/0033610 A1 | 2/2004 | Lovell et al. | |
| 2006/0148069 A1 * | 7/2006 | Fujita | 435/288.4 |
| 2008/0161204 A1 | 7/2008 | Li et al. | |

FOREIGN PATENT DOCUMENTS
EP 1691196 A1 8/2006

OTHER PUBLICATIONS

Betzig et al., Imaging Intracellular Fluorescent Proteings at Nanometer Resolution, Science, 2006, pp. 1642-1645, vol. 313.

\* cited by examiner

*Primary Examiner* — Thong Nguyen
(74) *Attorney, Agent, or Firm* — Morris Manning & Martin, LLP; Tim Tingkang Xia, Esq.

(57) ABSTRACT

A micro-mirror well. In one embodiment the micro-mirror well includes a plurality of planar mirrors arranged around an axis of symmetry and inclined to form a pyramid well, where each of the plurality of planar mirrors is capable of reflecting light emitting from an object of interest placed inside the pyramid well.

5 Claims, 3 Drawing Sheets

PHOTOLITHOGRAPHED MICRO-MIRROR WELL FOR 3D TOMOGRAM IMAGING OF INDIVIDUAL CELLS

CROSS-REFERENCE TO RELATED PATENT APPLICATION

This application is a divisional application of, and claims benefit of U.S. patent application Ser. No. 11/943,222, filed Nov. 20, 2007, entitled "PHOTOLITHOGRAPHED MICRO-MIRROR WELL FOR 3D TOMOGRAM IMAGING OF INDIVIDUAL CELLS," by Kevin Truett Seale, Ron Reiserer, and John Wikswo, now U.S. Pat. No. 7,974,003, the disclosure of which is hereby incorporated herein by reference in its entirety, and which itself claims the benefit, pursuant to 35 U.S.C. §119(e), of U.S. Provisional Patent Application Ser. No. 60/860,755, filed Nov. 22, 2006, entitled "PHOTOLITHOGRAPHED MICRO-MIRROR WELL FOR 3D TOMOGRAM IMAGING OF INDIVIDUAL CELLS," by Kevin Truett Seale, Ron Reiserer and John Wikswo, the disclosure of which is hereby incorporated herein by reference in its entirety.

STATEMENT OF FEDERALLY-SPONSORED RESEARCH

This invention was made with government support under Contract No. FA9550-05-1-0349 awarded by the Air Force Office of Scientific Research (AFOSR). The government has certain rights in the invention.

FIELD OF THE INVENTION

The present invention relates generally to a micro-mirrored well, and more particularly to a micro mirrored pyramidal well, its applications in multi-perspective three-dimensional (3D) microscopy to simultaneously collect images of an object of interest from multiple vantage points and a method of manufacturing same.

BACKGROUND OF THE INVENTION

One of the burgeoning areas of the development of modern microscopy is three-dimensional (3D) microscopy, which acquires three-dimensional image with every image plane sharply in focus. This is in contrast to conventional microscopy where the image of in-focus plane is superposed with blurred image of out-of-focus planes. Several developments of 3D microscopy have been reported. These techniques have been gaining popularity in the scientific and industrial communities. Typical applications include life sciences and semiconductor inspection.

An inverted microscope is a microscope with its light source and condenser on the top above the stage pointing down, and the objectives and turret are below the stage pointing up. Inverted microscopes are useful for observing living cells or organisms at the bottom of a large container (e.g. a tissue culture flask) under more natural conditions than on a glass slide, as is the case with a conventional microscope.

In confocal scanning microscopy (CSM), the out-of-focus signal is spatially filtered out by confocal aperturing of the object illumination and the detector points. The 3D image is constructed by pixel-by-pixel mechanical scanning of the entire object volume, which places a fundamental limit on the image acquisition speed.

A catadioptric system that uses a curved mirror to map a panoramic view onto a single sensor is able to obtain multi-perspective 3D images of an object, but has the limitation on sensor resolution. Furthermore, the resolution varies significantly with the viewing direction across the field of view (FOV).

Therefore, a heretofore unaddressed need exists in the art to address the aforementioned deficiencies and inadequacies.

SUMMARY OF THE INVENTION

In one aspect, the present invention relates to a micro-mirror well. In one embodiment, the micro-mirror well comprises a substrate having a first surface and an opposite, second surface defining a body portion therebetween. The body portion defines an inverted pyramid well having at least three side surfaces and a bottom surface extending to each other, where each of the at least three side surfaces defines an angle, $\theta$, relative to the bottom surface, where $0°<\theta<90°$. Each of the at least three side surfaces and the bottom surface is configured to reflect light emitting from an object of interest to be placed inside the inverted pyramid well in use. In one embodiment, the substrate includes a silicon wafer.

In one embodiment, each of the at least three side surfaces and the bottom surface has a mirror. The mirror can be a dichroic mirror. In one embodiment, the inverted pyramid well has a focus being equidistant from all of the at least three side surfaces and the bottom surface, where the position of the focus is inside the inverted pyramid well. In another embodiment, the inverted pyramid well has a focus and the position of the focus is outside the inverted pyramid well. In one embodiment, the inverted pyramid well has a cross-sectionally geometrical shape of a polygon, a circle or an elongated circle. The object of interest, for example, can be a biological analyte including cells and proteins.

In another aspect, the present invention relates to a micro-mirror well. In one embodiment, a micro-mirror well includes a plurality of planar mirrors arranged around an axis of symmetry and inclined to form a pyramid well, where each of the plurality of planar mirrors is capable of reflecting light emitting from an object to be placed inside the pyramid well. In one embodiment, each of the plurality of planar mirrors comprises a dichroic mirror.

In yet another aspect, the present invention relates to a process of fabricating a micro-mirror well. In one embodiment, the process comprises the steps of providing a silicon substrate; etching off the silicon substrate, in a specific relation to the silicon crystal structure, so as to form an inverted pyramid well therein, where the inverted pyramid well has a plurality of side surfaces and a bottom surface extending to each other, where the each of the plurality of side surfaces defines an angle, $\theta$, relative to the bottom surface; and performing photolithographically masking and evaporating processes on the plurality of side surfaces and the bottom surface so as to form a mirrored pyramid well. The etching step is performed with a potassium hydroxide (KOH) etching process.

In a further aspect, the present invention relates to a 3D microscope having at least one mirrored pyramidal well (MPW) capable of simultaneously collecting images of an object of interest from multiple vantage points. The 3D microscope further has a microfluidic structure in communication with the at least one MPW. In one embodiment, the at least one MPW has a plurality of side mirrored surfaces and a bottom mirrored surface, where each of the plurality of side mirrored surfaces has an angle, $\theta$, relative to the bottom mirrored surface. The at least one MPW is made from the smooth angled surfaces of anisotropically etched silicon.

In yet a further aspect, the present invention relates to a 3D microscope. In one embodiment, the 3D microscope has a numerical aperture (NA) objective having a plurality of mirrors affixed such that the perimeter of the FOV of the NA objective contains reflected images of an object of interest.

In one aspect, the present invention relates to a 3D microscope comprising a NA objective having a plurality of mirrors affixed opposite an object of interest from the NA objective for collecting reflected images of the object of interest.

In another aspect, the present invention relates to an algorithm for reconstruction of simultaneous, multi-vantage point images into 3D structures of an object of interest. In one embodiment, the process comprises the steps of simultaneously collecting images of the object of interest form multi-vantage points surrounding the object of interest; and mapping the collected images of the object of interest to form a 3D image displaying the 3D structures of the object of interest. In one embodiment, the step of simultaneously collecting images of the object of interest comprises the step of collecting light from simultaneously emitting fluorophores of the object of interest. The step of simultaneously collecting images of the object of interest is performed with a MPW having a plurality of side mirrored surfaces and a bottom mirrored surface, each of the plurality of side mirrored surfaces defining an angle, $\theta$, relative to the bottom mirrored surface, and wherein $0° < \theta < 90°$.

In yet another aspect, the present invention relates to a simultaneous multi-color fluorescence microscope having a NA objective having a plurality of dichroic mirrors integrated for reflecting specific wavelength ranges into a collection cone of the objective, where the NA objective has a mirrored micro-device having a plurality of facets, each facet reflecting a different band of wavelengths.

In a further another aspect, the present invention relates to a spectral de-convolution algorithms including the steps of collecting light from simultaneously emitting fluorophores of the object of interest, and parsing the collected light.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein.

DETAILED DESCRIPTION OF THE INVENTION

Figure 1:
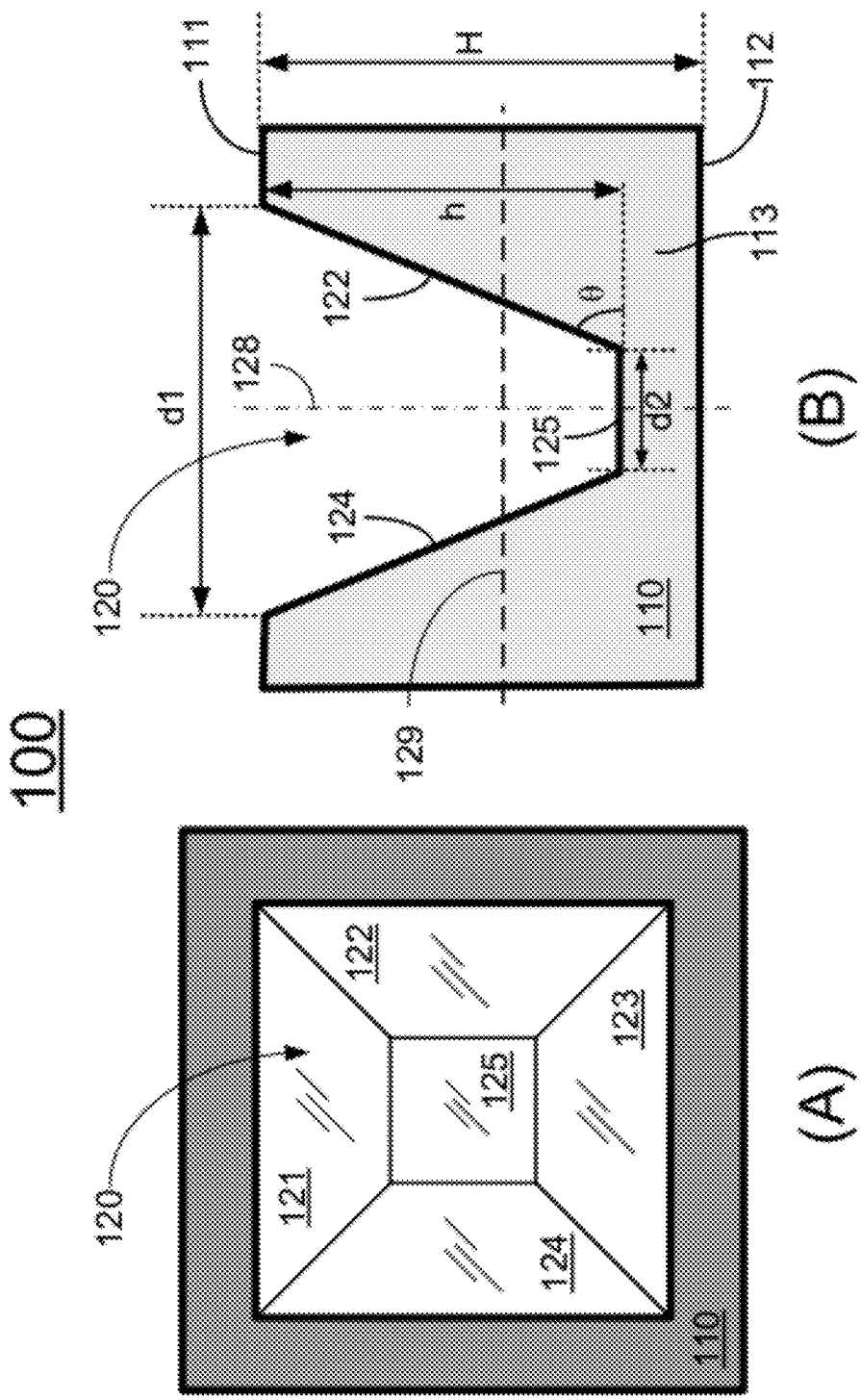
FIG. 1 shows schematically a mirrored pyramidal well according to one embodiment of the present invention: (A) a top view, and (B) a cross-sectional view.

The present invention is more particularly described in the following examples that are intended as illustrative only since numerous modifications and variations therein will be apparent to those skilled in the art. Various embodiments of the invention are now described in detail. Referring to the drawings, like numbers indicate like parts throughout the views. As used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings of FIGS. 1 and 2. In accordance with the purposes of this invention, as embodied and broadly described herein, this invention, in one aspect, relates to a micro MPW and its applications in a multi-perspective 3D microscopy.

Micro MPWs provide simultaneously high resolution 3D images of an object of interest, such as cells and groups of cells, without the need of a confocal microscopy. The present invention, among other things, discloses two classes of MPWs: introverted MPWs and extroverted MPWs. Introverted MPWs are those for which a single focus point being equidistant from all mirrored surfaces, for example, four side surfaces and/or a bottom surface of a pyramidal well, is inside the pyramidal well. Extroverted MPWs are those with a focus outside of the pyramidal well and could be developed with the advantage of positioning a specimen wherever convenient such as on a surface of an ordinary coverslip as in an inverted microscope setup. Introverted wells are useful for obtaining and studying 3D images of single cells, cell-cell pairs (as in immunology studies) or cell clusters (as in a developing embryo). Extroverted wells have the additional advantage of being used with samples that exist outside of the pyramidal well, a cellular monolayer, for instance. The envisional product is a coverslip or slide that is used instead of the ordinary coverslip or slide and containing an array of extroverted mirrored pyramidal wells that may be used on an inverted or conventional wide-filed microscope with little or no additional effort on the part of the microscopist. Four sets of introverted MPWs have been made and used to study dictyostelium under live cell conditions and fixed and stained with bright field and fluorescence microscopy at Vanderbilt University.

Figure 2:
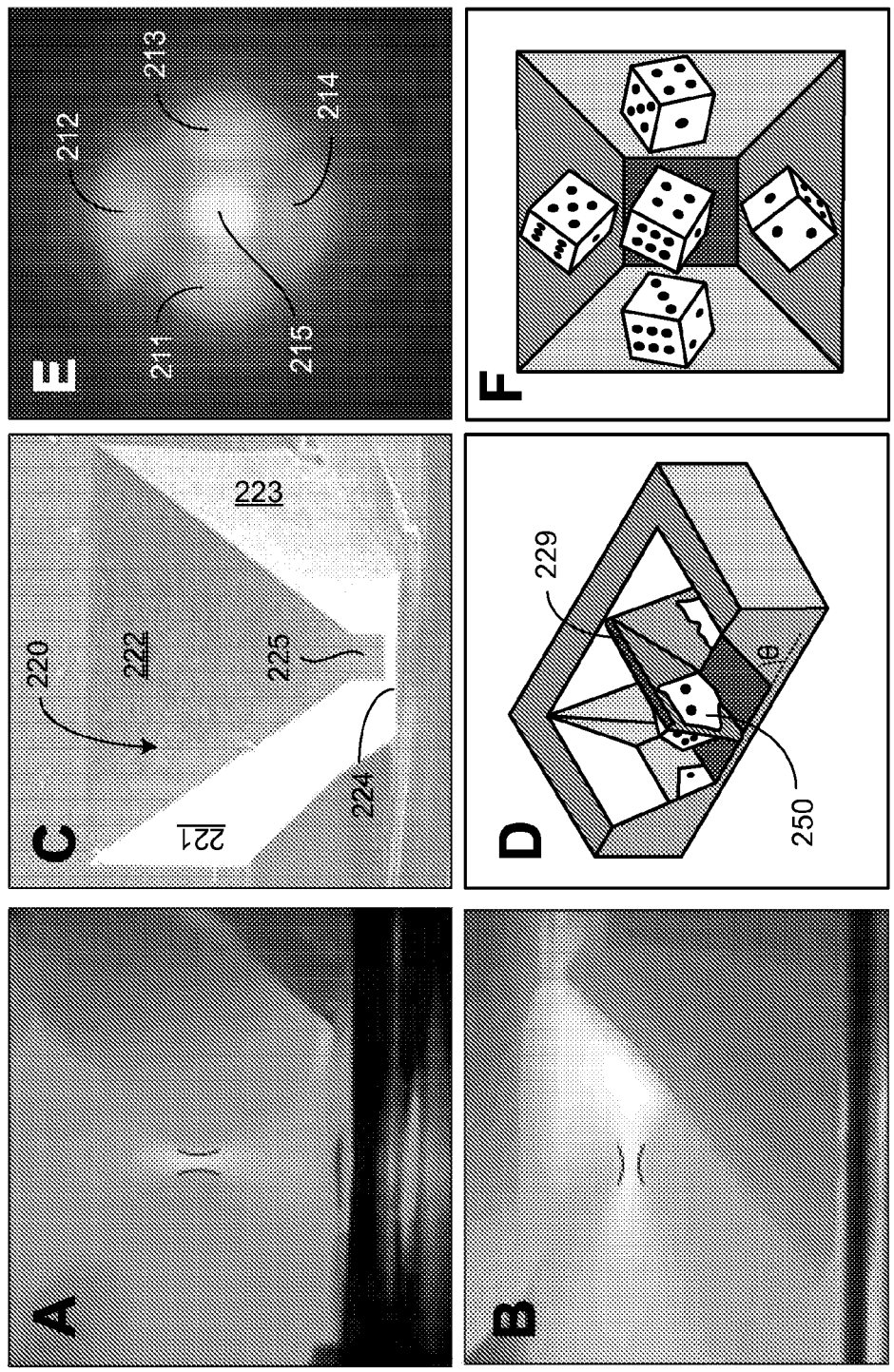
FIG. 2 shows (A) and (B) ordinary collection cone and reflected collection cone from a 40X objective, (C) a scanning electron microscope (SEM) image of a MPW, (D) rendering of focal plane reflected by mirrors, (E) Five simultaneous views of a fluorescently labeled T cell, and (F) rendering of a 45° MPW, according to embodiments of the present invention.

Referring to FIG. 1, a micro-mirror well 100 is shown according to one embodiment of the present invention. The micro-mirror well 100 has a substrate 110 having a first surface 111 and an opposite, second surface 112 defining a body portion 113 therebetween. The body portion 113 has a thickness, H. The body portion 113 defines an inverted pyramid well 120 having a first, second, third and fourth side surfaces 121, 122, 123, and 124 (i.e., 121-124) and a bottom surface 125 extending to each of the side surfaces such that the inverted pyramid well 120 has a height, h, which is less than the thickness H of the substrate 110, a top width, d1, at the first surface 111 of the substrate 110, and a bottom width, d2, at the bottom surface 125, where the top width d1 is greater than the bottom width d2. Each of the first, second, third and fourth side surfaces 121-124 and the bottom surface 125 is configured to reflect light emitting from an object of interest placed inside or outside the inverted pyramid well 120. The object of interest (not shown), to be for example, can be a biological analyte including cells and proteins. As shown in FIG. 1, each of the first, second, third and fourth side surfaces 121-124 defines an angle, $\theta$, relative to the bottom surface 125, respectively, where $0° < \theta < 90°$. In one embodiment shown in FIG. 1, $45° < \theta < 90°$. In another embodiment shown in FIG. 3, $0°<\theta\leq 45°$. The angles defined between the side surfaces and the bottom surface can be same, or different.

In one embodiment, the inverted pyramid well 120 is formed to have a focus (not shown) being equidistant from all of the first, second, third and fourth surfaces and the bottom surface, where the position of the focus is inside the inverted pyramid well 120, i.e., beneath the top surface plane 111 of the substrate 110. In another embodiment, the inverted pyramid well 120 is formed to have a focus (not shown) that is outside the inverted pyramid well. The former corresponds to an introverted pyramid well, while the latter corresponds to an extroverted pyramid well. The inverted pyramid well 120 can be utilized to obtain simultaneous views of microscopy specimens placed in the inverted pyramid well 120 from multiple, nearly-orthogonal vantage points. In the embodiment shown in FIG. 1, the inverted pyramid well 120 has a cross-sectionally geometrical shape of a square. The inverted pyramid well 120 can have a cross-sectionally geometrical shape of a triangle, polygon, a circle or an elongated circle.

Figure 3:
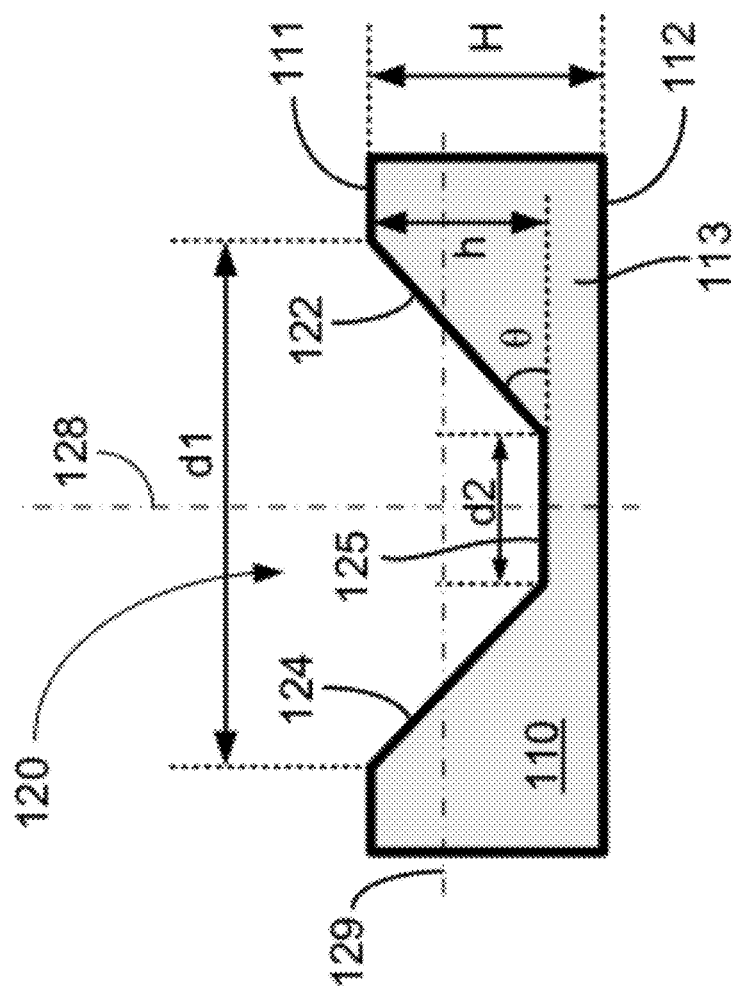
FIG. 3 shows schematically a cross-sectional view of a mirrored pyramidal well according to another embodiment of the present invention.

The micro-mirror well 100 can be fabricated with a silicon substrate 110. In one embodiment, the fabrication process includes the following steps: at first, a silicon substrate 110 is provided. Then the silicon substrate 110 is etched off in a specific relation to the silicon crystal structure so as to form an inverted pyramid well 120 therein. The inverted pyramid well 120 has a plurality of side surfaces 121-124 and a bottom surface 125 extending to each of the side surfaces 121-124, where each of the plurality of side surfaces 121-124 has an angle, $\theta$, relative to the bottom surface 125, where $0°<\theta<90°$. That is, each of the side surfaces 121-124 defines an angle $\theta$ relative to a horizontal axis 129 that is orthogonal to a vertical axis 128 such that $0°<\theta<90°$. In one embodiment, $45°<\theta<90°$, for example $\theta=57°$, as shown in FIG. 1. In another embodiment, $0°<\theta\leq 45°$, for example $\theta=33°$, as shown in FIG. 3. Next, photolithographically masking and evaporating processes are performed on the plurality of side surfaces 121-124 and the bottom surface 125 of the inverted pyramind well 120 so as to form a mirrored pyramid well. The etching step is performed with a KOH etching process. Subsequent photolithographic masking and evaporation of platinum on the angled surfaces produces a mirrored well within which a single cell can be placed. When a cell is placed in the mirrored pyramid well, the cell can be imaged directly and a nearly-orthogonal image can be obtained with a deeper focus from the mirrored surface of the pyramid well. An elongated image due to the 57 degree angle between the side mirror surfaces and the bottom mirrored surface of the pyramid well can be corrected digitally. The combination of four such images and an original straight-on image gives an overall view of the cell from which the 3D coordinates of any intracellular or cell membrane structure may be identified.

The micro-mirror well can also be formed with, for example, a plurality of planar mirrors. The plurality of planar mirrors is arranged around an axis of symmetry and inclined to form a pyramid well. Each of the plurality of planar mirrors is capable of reflecting light emitting from an object placed inside the pyramid well. Each of the plurality of planar mirrors can be a dichroic mirror capable of reflecting specific wavelength ranges.

The pyramid well can be combined with an appropriate microfluidic superstructure to produce in very high dimensional arrays, forming a micro-mirror device usable in cellular studies. In one embodiment, a flow channel with mirrored angular sides to allow observing cells in a flowing stream is demonstrated.

According to one embodiment of the present invention, an in-vivo image of a cell (wide-field and confocal, bright-field and fluorescent) is acquired by means of an introverted well that is polished such that the bottom of the well no longer exists. The introverted well provides a declinated perspective of in-vivo tissue when placed (without compression) directly on the tissue in question. In addition to the ordinary (XY) microscope or confocal plane, the bottomless MPW provides four planes which are nearly orthogonal to the XY plane, and thus giving access to planes which may contain the entire junction between adjacent and connected cells, the junction between epithelial cells, for instance.

In one embodiment, a cell-sized MPW is made from the smooth angled surfaces of anisotropically etched silicon to provide simultaneous images of a specimen (sample) from multiple vantage points. A scanning electron microscope (SEM) image of such an MPW 220 having four mirrored side walls (surfaces) 221-224 and a bottom surface 225 is shown in FIG. 2C. The MPW 220 increases the effective numerical aperture of a microscope objective by collecting more light from a specimen (sample) placed inside the MPW 220. This enables high magnification images of individual live cells and cell colonies in all three dimensions simultaneously. Reflection of the collection cone from cell-sized introverted mirrors very near the sample reorients the point spread function of the objective into the XZ or YZ plane, as shown in FIGS. 2A and 2B, and reorients the focal plane of the objective, as shown in FIG. 2D. The mirrored side surfaces (walls) 221-224 redirect the side view image of the sample into the objective providing simultaneous multiple views. In this embodiment shown in FIGS. 2D and 2F, a die 250 is used as a sample placed inside the MPW 220 for evaluation of the invention. FIG. 2D shows schematically a focal plane 229 reflected by side mirrors 221-224. In the embodiment, the focus of the introverted MPW, or the point equidistant from each mirrored wall (surface), lies inside the pyramid well since the side surfaces (walls) 221-224 and the bottom surface 225 of the pyramid well 220 define an angle $\theta$ that is greater than 45°. The mirrored walls increase signals significantly without concomitant increase in noise thus making them a good platform for bioluminescent assays as well as fluorescent imaging. FIG. 2E shows an image of a T cell loaded with Rhod-II (a calcium-sensitive indicator) in the MPW 220 taken with a low numerical aperture objective. The central image 215 is enhanced by reflection from the bottom 225 of the pyramid well 220 and the four images 211-214 of reflections from the four side walls 221-224, respectively, of the pyramid well 220 are clearly visible. FIG. 2F is a simulation of a 45° mirrored well, illustrating the additional information content in an image obtained from an MPW. MPWs can be made in any size, ranging from µm to mm, and in any arrangement and may be coupled with microfluidic superstructures for efficient delivery of the specimen and reagents. Extroverted wells with a focus outside of the pyramid well could be developed with the advantage of positioning the specimen wherever convenient such as on the surface of an ordinary coverslip as in an inverted microscope setup.

According to the present invention, the MPWs are capable of redirecting (reflecting) more light from chemiluminescent and/or bioluminescent samples into the objective of a microscope, comparing to conventional light reflecting means. When a sample emits light in all directions, but without mirrors, the only light that can be directed is what happens to be headed in the direction of the objective. With the mirrors, the MPWs should increase the signal more than the noise of the measurement, and make some bioluminescent microscopy possible.

For a four sided MPW, there are on the order of 5 times increase in signal to noise from the pyramidal well, since it can provide four simultaneous views from four different vantage points and a view from the bottom that are almost within the plane, as shown in FIG. 2E, which is called the superficial sideview of a sample, which arises from white light impingent on the sample that reflects off the mirror by specular reflection and into the objective. In one embodiment, an image of a sample placed inside the MPW may be magnified at about 100 times.

The extroverted mirrors are a distinct class that opens up new possibilities for illumination—for instance, the use of the standard inverted microscope platform might be possible.

For a fluorescent microscopy utilizing such a pyramidal well to collect reflected or emitted light from a sample of interest, it would benefit in exactly the same way, though the noise might go up a little more due to reflection of the excitation wavelengths. Collecting multiple colors now is slow because the filters have to be mechanically changed by rotating wheel. Dichroic micro-mirrors can be utilized to form the MPW for collecting simultaneously images of different colors. Deconvolution of wide-field microscopy images has always been criticized for being error prone. Additional interrogation of the sample from different perspectives might reduce the possibility of error from calculation. This is especially true if the point-spread function of the objective changes in a known way from reflection off of the mirror.

Further aspects of the present invention provide a 3D microscope and a simultaneous multi-color fluorescence microscope. The 3D microscope requires simple hardware, sufficient data and a means to visualize the specimen in three dimensions while sitting at the microscope. The simultaneous multi color fluorescence microscope requires that the mirrors of the device be dichroic, and appropriate spectral deconvolution.

In one embodiment, the 3D microscope includes at least MPW capable of simultaneously collecting images of an abject of interest from multiple vantage points. The 3D microscope further comprises a microfluidic structure in communication with the at least one MPW. The at least one MPW is made from the smooth angled surfaces of anisotropically etched silicon. Two types of integrated mirrored objectives are developed: one is a low numerical aperture objective with mirrors affixed such that the perimeter of the field of view contains reflected images of the specimen; the other is a low numerical aperture objective with mirrors affixed opposite a sample from the objective, displaying reflected images of the sample. Reflective geometries with more than four facets, and extroverted angles are created by using objectives with low numerical apertures and narrow collection cones to interrogate the specimen from more unique angles than merely four, further increasing the numerical aperture and adding more three dimensional information.

Another aspect of the present invention relates to an algorithm for reconstruction of simultaneous, multi-vantage point images into three dimensional (3D) structures of an object of interest. In one embodiment, the algorithm includes the steps of simultaneously collecting images of the object of interest form multi-vantage points surrounding the object of interest; and mapping the collected images of the object of interest to form a 3D image displaying the 3D structures of the object of interest.

The step of simultaneously collecting images of the object of interest has the step of collecting light from simultaneously emitting fluorophores of the object of interest. In one embodiment, the step of simultaneously collecting images of the object of interest is performed with a MPW having a plurality of side mirrored surfaces and a bottom mirrored surface, each of the plurality of side mirrored surfaces having an angle, $\theta$, relative to the bottom mirrored surface, where $0° < \theta < 90°$.

The simultaneous multi-color fluorescence microscope in one embodiment has a NA objective having a plurality of dichroic mirrors integrated for reflecting specific wavelength ranges into a collection cone of the objective: By integrating dichroic mirrors for reflecting specific wavelength ranges into the collection cone of the objective, mirrored microdevices with different facets reflecting a different band of wavelengths are invented. Dividing the visible spectrum into eight (possibly more) increments with specifically designed dichroic layers is achieved. The spectral deconvolution algorithms necessary for parsing collected light from simultaneously emitting fluorophores is developed. The novel experimental methods for simultaneous multi-color cellular fluorescence are disclosed:

The invented technology benefits fields requiring structural and quantitative microscopy by providing more information to the investigator with little additional effort. It also benefits data collection using microscopy with fluorescent reporters of biological activity (ie FRET or chemiluminescence) because it significantly increases the signal without increasing noise, effectively increasing the numerical aperture of the objective, and the scale of the device is compatible with new bioMEMs technology. The integration of dichroic films ushers in an era of truly simultaneous multi-fluorophore cellular studies.

It is noted that single molecule imaging as demonstrated by Eric Betzig's photo-activated light microscopy (Eric Betzig, et al., Imaging Intracellular Fluorescent Proteins at Nanometer Resolution, *Science,* 313, 1642 (2006)) can be conducted in MPWs on fixed cells containing photo-activatable moieties with the result being absolute three dimensional location of individual molecules within a cell. Betzig's photo-activated light microscopy is limited to a two-dimensional region accessible by TIRF microscopy. By applying the MPW according to the present invention, a superficial sideview image of a cell from multiple vantage points can be obtained.

The present invention, among other things, recites a micromirror well having a plurality of planar mirrors arranged around an axis of symmetry and inclined to form a pyramid well. Each of the plurality of planar mirrors is capable of reflecting light emitting from an object of interest placed inside the pyramid well. The mirrored pyramid well has applications in multi-perspective three-dimensional (3D) microscopy to simultaneously collect images of an abject of interest from multiple vantage points.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A micro-mirror well, comprising:
a substrate having a first surface and an opposite, second surface defining a body portion therebetween, wherein the body portion defines an inverted pyramid well having at least three side surfaces and a bottom surface extending to each of the side surfaces,
wherein each of the at least three side surfaces and the bottom surface is configured to reflect light emitting from an object of interest to be placed outside the inverted pyramid well in use,
wherein the inverted pyramid well has a focus that is positioned outside the inverted pyramid well, and
wherein at least one of the side surfaces is configured to selectively reflect light of a first predetermined wavelength range and at least one other of the side surfaces is configured to selectively reflect light of a second predetermined wavelength range that is different from the first predetermined wavelength range.

2. The micro-mirror well of claim 1, wherein each of the at least three side surfaces defines an angle, $\theta$, relative to the bottom surface, and wherein $0°<\theta<45°$.

3. A micro-mirror well, comprising:
a plurality of planar mirrors arranged around an axis of symmetry and inclined to form a pyramid well with a plurality of side surfaces and a bottom surface having a planar mirror, the bottom surface extending to each of the plurality of side surfaces, wherein each of the plurality of planar mirrors is configured to reflect light emitting from an object of interest placed outside the pyramid well in use,
wherein the inverted pyramid well has a focus that is positioned outside the inverted pyramid well, and
wherein at least one of the side surfaces is configured to selectively reflect light of a first predetermined wavelength range and at least one other of the side surfaces is configured to selectively reflect light of a second predetermined wavelength range that is different from the first predetermined wavelength range.

4. The micro-mirror well of claim 3 wherein each of the plurality of planar mirrors comprises a dichroic mirror.

5. The micro-mirror well of claim 3, wherein each of the plurality of side surfaces defines an angle, $\theta$, relative to the bottom surface, and wherein $0°<\theta<45°$.

* * * * *